US007327248B2

(12) United States Patent
Odenwald et al.

(10) Patent No.: US 7,327,248 B2
(45) Date of Patent: Feb. 5, 2008

(54) GENERATING ELECTRONIC SEALS

(75) Inventors: Thomas Odenwald, Redwood City, CA (US); Brian S. Mo, Palo Alto, CA (US); Asuman Suenbuel, San Jose, CA (US)

(73) Assignee: SAP Aktiengesellschaft, Walldorf (DE)

( * ) Notice: Subject to any disclaimer, the term of this patent is extended or adjusted under 35 U.S.C. 154(b) by 302 days.

(21) Appl. No.: 11/027,833

(22) Filed: Dec. 30, 2004

(65) Prior Publication Data

US 2007/0164857 A1   Jul. 19, 2007

(51) Int. Cl.
*G08B 23/00*   (2006.01)
(52) U.S. Cl. .................................... 340/517; 340/568.7
(58) Field of Classification Search ................ 340/505, 340/572.1–572.8, 539.13, 571, 545.4, 568.7, 340/10.1, 825.69, 539.22, 517, 507
See application file for complete search history.

(56) References Cited

U.S. PATENT DOCUMENTS

| 5,726,627 | A * | 3/1998 | Kane et al. ................. 340/531 |
| 7,002,472 | B2 * | 2/2006 | Stratmoen et al. ..... 340/539.26 |
| 2004/0041705 | A1 * | 3/2004 | Auerbach et al. ...... 340/539.22 |
| 2004/0196182 | A1 * | 10/2004 | Unnold ................... 342/357.07 |
| 2005/0046567 | A1 * | 3/2005 | Mortenson et al. .... 340/539.13 |
| 2005/0088299 | A1 * | 4/2005 | Bandy et al. .......... 340/539.16 |
| 2005/0252259 | A1 * | 11/2005 | Ekstrom ....................... 70/257 |
| 2006/0109106 | A1 * | 5/2006 | Braun .................... 340/539.13 |
| 2006/0164239 | A1 * | 7/2006 | Loda ..................... 340/539.22 |

OTHER PUBLICATIONS

Learn About RFID. [online]. Savi Technology and EPCGlobal, 2004 [retrieved on Dec. 21, 2004]. Retrieved from the Internet: <URL: www.savi.com/rfid.shtml>.
Motes, Smart Dust Sensors, Wireless Senor Networks [online]. Crossbow Technology, Inc., 2004 [retrieved on Dec. 21, 2004]. Retrieved from the Internet: <URL: www.xbow.com/products/productsdetails.aspx?sid=3>.
Sensor/Data Acquisition Modules [online]. Crossbow Technology, Inc., 2004 [retrieved on Dec. 21, 2004]. Retrieved from the Internet: <URL: www.xbow.com/products/productsdetails.aspx?sid=63>.
Felming & Kushner, "Ultra-Wideband for PicoRadio Networks," Focus2000 / Aether Wire & Location, Inc., 22 pgs. (2000).
Huang, G., "Casting the Wireless Sensor Net," Technology Review; Jul./Aug. 2003.

* cited by examiner

*Primary Examiner*—Phung T. Nguyen
(74) *Attorney, Agent, or Firm*—Fish & Richardson P.C.

(57) ABSTRACT

A system for generating an e-seal for a container includes a sensor to detect a condition associated with the container and to generate a sensor reading based on the condition, and a processing device to generate the e-seal based on the sensor reading. The sensor reading may include first and second readings from the sensor, where the first reading is recorded at a first time and the second reading is recorded at a second time.

21 Claims, 4 Drawing Sheets

GENERATING ELECTRONIC SEALS

TECHNICAL FIELD

This disclosure relates to generating electronic seals ("e-seals") using sensor network parameters.

BACKGROUND

During transport, a shipping container may be infiltrated by saboteurs seeking to tamper with the contents inside. A container is especially vulnerable to tampering when left in situations that are unattended. Such situations include unsecured or minimally secured storage and layovers during transit. To detect tampering, inspectors may look inside the shipping container or view a surveillance video of the container. A container that is suspected of being tampered with is often scanned by X-ray and gamma ray machines, and/or sniffed by trained dogs. Though these detection methodologies may determine whether or not the container has been tampered with, they usually cannot detect the tampering as it occurs in real-time.

SUMMARY

In general, in one aspect, the invention features a system for generating an e-seal for a container. The system includes a sensor to detect a condition associated with the container and to generate a sensor reading based on the condition, and a processing device to generate the e-seal based on the sensor reading. This aspect may also include one or more of the following features.

The sensor and the processing device may be a sensor node of a sensor network, or the sensor may be part of a sensor node of a sensor network and the processing device may be part of an e-seal management system that communicates with the sensor network. The sensor node may include a radio frequency transceiver and a programmable processor for use in communicating with the processing device.

The sensor reading may include first and second readings from the sensor. The first reading may be recorded at a first time and the second reading may be at a second time, where the second time is after the first time. The processing device may generate the e-seal by applying the first and second readings to a formula that generates the e-seal. The formula may be a sum of an absolute value of a difference between the first and second readings. The reading may be an environmental condition associated with the container. The environmental condition may relate to at least one of temperature, humidity, light, heat, carbon dioxide levels, chemical contamination, location, and movement. The sensor network may be organized hierarchically.

In general, in another aspect, the invention is directed to a method for generating an e-seal for a container. The method includes defining a formula for generating an e-seal for the container, storing sensor readings associated with a condition of the container, and applying the readings to the formula to generate the e-seal. This aspect may include one or more of the following features.

The formula may be defined by storing a set of parameters that correspond to the sensor readings, and defining relationships between the parameters. The method may include obtaining the sensor readings from a plurality of sensors, where the plurality of sensors are at a location proximate to the container. The method may also include detecting whether at least one of the sensors is defective and, if a defective sensor is detected, applying readings from sensors that are operational to an alternate formula to generate an e-seal. The location may be on, near, or inside the container. The e-seal may be generated in real-time.

Other aspects of the invention may feature apparatus and computer program products that are used to perform the foregoing method, or that are used with the foregoing system.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1b is a diagram of a sensor node for use with the system of FIG. 1a.

FIG. 1c is a diagram of an e-seal management system for use with the system of FIG. 1a.

FIG. 1d is a diagram of a client for use with the system of FIG. 1a.

DETAILED DESCRIPTION

Shipping containers or any other type of container equipped with sensor technology can be "sealed" by generating an e-seal. In this context, an e-seal is a unique value that represents a condition associated with the container. The e-seal may be generated by applying sensor readings as parameters to a predefined formula. Any change in a sensor reading will alter the outcome of the formula's calculation. If the change in the outcome is large enough, the e-seal is deemed broken. For example, when the integrity of a container is breached, due to tampering for example, a change in environmental condition resulting from the tampering is reflected by the sensor readings which, in turn, alter the outcome of the formula to indicate a seal break. The integrity of a container may be breached when the container or a portion of the container is opened, punctured, crushed, moved without authorization, or subjected to an environment that may damage the contents. If the integrity of the container is breached, an alert may be generated and sent to the proper authorities. When the container arrives at its final destination, the recipient may verify the integrity of the container from a report containing the logged monitoring sessions.

FIGS. 1a-1d illustrate an example of a system 100 for use in generating an e-seal for a container 116. Container 116 may be any container including a shipping container, a storage container, a box, a bag, and a cargo holder such as that of a truck or an airplane. Container 116 may also be a building, a room, or any other housing that encloses a space. Container 116 may be any size and shape. Furthermore, container 116 may be made of metal, plastic, wood, cloth, composite, and/or any other appropriate material.

Figure 1A:
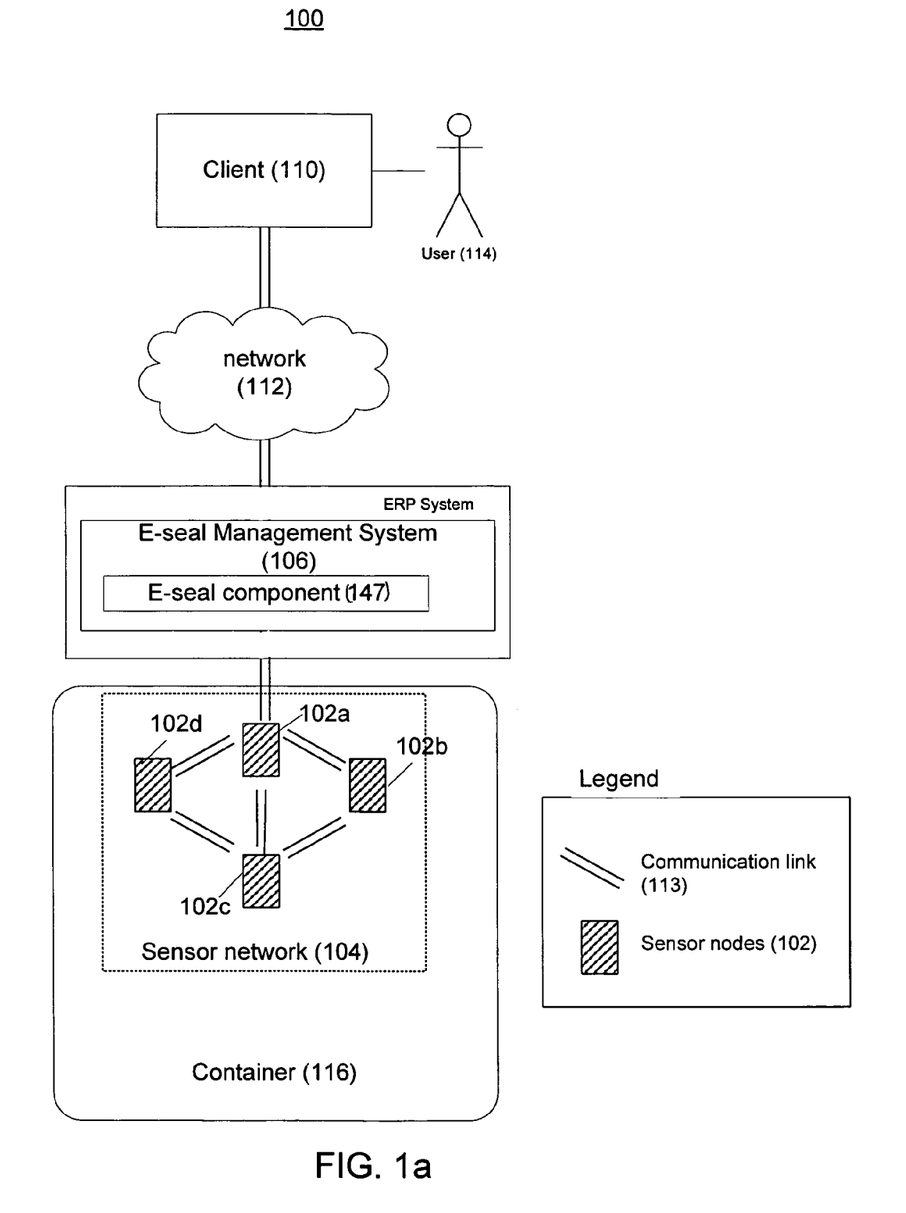
FIG. 1a is a diagram of a system for generating an e-seal for a container.

System 100 includes a sensor network 104, an e-seal management system 106 (which may be part of a larger enterprise resource planning (ERP) system), a client 110, and one or more networks, such as network 112. In this embodiment, sensor network 104 is a distributed collection of sensor nodes 102a, 102b, 102c, and 102d (collectively referred to as sensor nodes 102) interconnected by communications links 113. Sensor nodes 120 may be placed inside, attached to, embedded within, or positioned in close proximity to the container 116. Sensor nodes 102 sense one or more conditions of container 116 (e.g., environmental conditions) and generate readings representative thereof. As described below, the sensor nodes 102, which are equipped with sensors 130, perform routing functions to create a peer-to-peer networking fabric that relays data, including the sensor readings, to an e-seal management system 106. The e-seal management system 106 receives the data gathered by the sensor network 104, performs additional processing on the data (if necessary), and delivers the data to one or more clients 110 over an network 112. From the sensor readings, an e-seal representative of the integrity of container 116 is generated. The e-seal may be generated by a sensor node (e.g., sensor node 102a) or by e-seal management system 106.

Figure 1B:
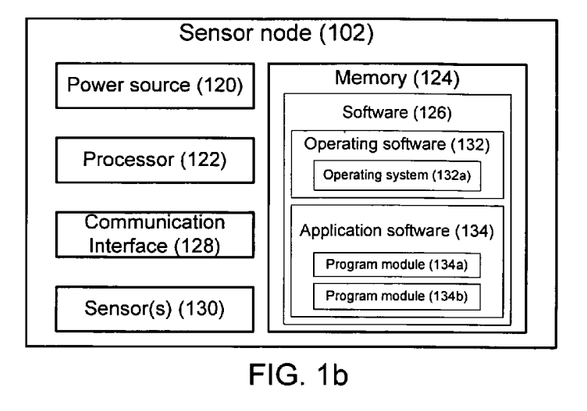

In this embodiment, sensor nodes 102 are similar both in structure and in function. Therefore, only one sensor node, namely sensor node 102a, is described in detail. Sensor node 102a is a programmable electronic device (e.g., a computer) having processing, sensing, and communication capability. Sensor node 102a includes a power source 120 (e.g., a battery), one or more processors (referred to herein as "processor 122"), memory 124 for storing software 126, a communication interface 128, and one or more sensors 130. Sensor node 102a communicates with adjacent sensor nodes 102b to 102d over communication links 113. Communication links 113 may include any kind or combination of modem links, Ethernet links, cables, point-to-point links, infrared connections, fiber optic links, wireless links, cellular links, satellite links, and other appropriate communication links. The sensor nodes, including sensor nodes 102a, may be programmed automatically by the E-Seal Management System to account for sensitivities of the container or its contents. Sensor nodes 102 may be organized as a hierarchy of sensor nodes, in which a sensor node at the top of the hierarchy (referred to herein as the "top sensor node") coordinates the functions of the other sensor nodes. In this example, the top sensor node may be a base station that interfaces sensor network 104 and e-seal management system 106. The base station may use a General Packet Radio Service (GPRS) platform or any other packet-based communication scheme. In another example, the sensor nodes 102 may be assigned to various levels within a hierarchy such that a sensor node on one level oversees sensor nodes on a level directly below.

Sensor node 102a is equipped with a communication interface 128 for communicating with other sensor nodes 102b, 102c, and 102d and for communicating with e-seal management system 106. Communication interface 128 may be any appropriate device or hardware component(s) for sending and receiving information. For example, communication interface 128 may be a wireless communication device such as a wireless interface card for a local area network, e.g., IEEE 802.11 or Bluetooth®; or a wireless modem for a wide area network, e.g., a cellular network that uses the IS-95 or IS-136 protocols. Communication interface 128 may also be a wired communication device such as a dialup modem, a digital subscriber line (DSL), or a cable modem. Communication interface 128 may also be a radio frequency identification (RFID) transponder, an Ethernet port, or a telephone port. These devices may also include one or more original equipment manufacturer (OEM) components or a hardware stack that implement(s) the foregoing communication protocols and/or proprietary communication radio frequency (RF) protocols.

Processor 122 of a sensor node 102 executes software 126, which includes operating software 132 and application software 134. Operating software 132 includes operating system 132a, such as TinyOS (developed at the University of California, Berkeley). Operating system 132a may also be UNIX®, Windows 2000®, Windows NT®, Sun®, Linux®, Macintosh®, or other appropriate operating system or operating system kernel. Application software 134 includes one or more program modules 134a, 134b. Each program module 134a, 134b includes executable code that is either loaded into memory 124 prior to deployment of the sensor node, or received over the wireless communication links post-deployment. Such post-deployment programming enables the sensor nodes 102 associated with the container to be programmed (or reprogrammed) dynamically via the E-Seal Management System, thus providing for application upgrades or changes, and in some cases, recovery from program induced crashes or failures, e.g., through remote rebooting.

Each sensor node 102a, 102b, 102c, and 102d includes one or more sensor(s) 130 for detecting different conditions. In this embodiment, environmental conditions are detected; however, the invention is not limited as such. Sensor 130 may be any environmental sensor that senses an environmental condition and generates a reading thereof. For example, sensor 130 may be a temperature sensor, such as a resistive temperature device or a thermocouple. Other environmental conditions that may be detected by sensor 130 include humidity, carbon dioxide levels, chemicals, light, acceleration, vibration, location, sound, and radiation. For sensing humidity, sensor 130 may be a hygrometer or a relative humidity indicator. For sensing carbon dioxide levels and chemicals including nerve agents, blister agents, and arsenical vesicants, sensor 130 may be a chemical agent detector such as a photospectometer, chemical detection paper, or a colorimetric tube. For sensing light, including the visible, infrared (IR), and ultraviolet (UV) light, the sensor 130 may be a photocell, a bolometer, a photosensor, a charge-coupled device, or any other appropriate light sensing device. For sensing acceleration and vibration, sensor 130 may be an accelerometer, a gyroscope, or any other appropriate movement detection device. For sensing location, sensor 130 may include a global positioning satellite (GPS) receiver, a base station monitor, a bar code scanner, or any other appropriate position sensing device. For sensing sound, sensor 130 may be a microphone. For sensing radiation, sensor 130 may be a bolometer, a Geiger counter, a scintillometer, or any other appropriate radiation sensing device. Sensor 130 may also incorporate more than one of the aforementioned elements in a single device.

Sensor readings are time stamped and synchronized to indicate the time at which they were recorded. The sensor readings may be processed and analyzed autonomously in a single sensor node (e.g., sensor node 102a) or in cooperation with neighboring sensor nodes 102b to 102d to generate pre-processed sensor readings that require less bandwidth and power to transmit. The raw sensor readings, pre-processed sensor readings, or a combination thereof may be passed from sensor node to sensor node over peer-to-peer sensor network 104 and transmitted to e-seal management system 106. Sensor network 104 may transmit the readings to e-seal management system 106 at pre-defined time intervals or upon receiving a "request to send" command.

Figure 1C:
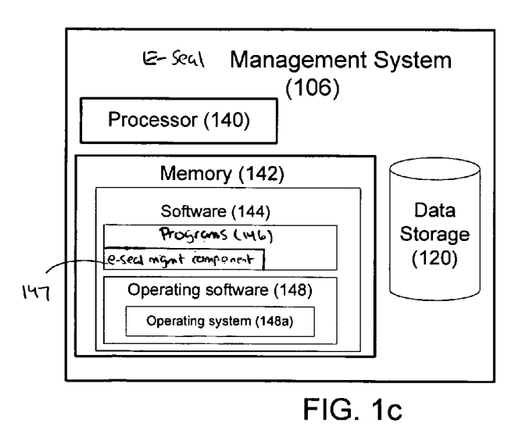

E-seal management system 106 receives sensor readings taken over successive periods of time. An e-seal management component 147 running in e-seal management system 106 applies the readings to a predetermined formula to obtain a unique output value, which represents an e-seal. The formula may be defined by user 114 at client 110, where the user chooses parameters (e.g., temperature and humidity) and specifies a mathematical relationship between the parameters. The formula may be stored in memory 142. As described in more detail below, e-seal management component 147 extracts the e-seal formula (which may be encrypted) from memory 142 and applies received sensor readings to the formula to obtain a unique e-seal for container 116. The e-seal may be stored in memory 142. As further readings from sensor nodes 102 are received by e-seal management component 147, the e-seal may be recalculated. As the environmental conditions change, due to tampering or natural variation, the sensor readings change and when applied to the formula, the e-seal changes. The magnitude of change in the e-seal is analyzed by e-seal management component 147 to determine whether the e-seal has been broken. The analysis may be tailored to reduce misinterpretation of acceptable environmental variations for tampering. Thus, by tracking the variation of the e-seal over time, e-seal management component 147 may detect tampering of container 116 in real-time (i.e., without a significant time lag between tampering and detection of the tampering).

E-seal management system 106 may be any type of computing device including one or more processors, (referred to simply as "processor 140"), and memory 142 that stores software 144. E-seal management system 106 may include separate data storage module 120 for storing sensor readings, formulas (e.g., one or more computer programs) for generating e-seals, threshold values, and other data related to monitoring the integrity of container 116. Data storage module 120 may be a database or a collection of databases. Processor 140 executes software 144, which includes one or more programs 146 and operating software 148. Operating software 148 includes, but is not limited to, an operating system 148a and one or more routines for effecting communication over the network 112. In one example, the e-seal management system 106 is implemented on an SAP® Web Application Server. In another example, the e-seal management system is implemented on a Crossbow Technology Stargate® server coupled to an SAP Netweaver® application platform. Programs 146 include e-seal management component 147 (noted above), which performs the processes of FIGS. 2 and 3 below.

Figure 1D:
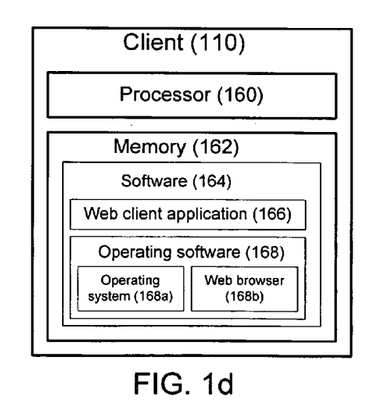

Through a user interface provided at client 110 by e-seal management system 106, a user 114 may define a formula for generating an e-seal and upload the formula to e-seal management system 106 or to sensor network 104. In one embodiment, one or more sensor nodes 102 generate the e-seal without assistance from e-seal management system 106. A process for defining a formula that generates an e-seal is described in detail in FIG. 2. Through client 110, user 114 may also view the activity of sensor nodes 102 at a node-level or a network-level, determine the health status (e.g., battery level) of individual sensor nodes 102, reprogram individual sensor nodes 102, view information stored in e-seal management system 106, and install software on e-seal management system 106.

Client 110 may be any type of Network-enabled apparatus or system. Examples of such apparatuses or systems include, but are not limited to, a desktop computer, a laptop computer, a mainframe computer, a cellular telephone, a personal digital assistant ("PDA"), and a controller embedded in an otherwise non-computing device. Client 110 contains one or more processor(s) 160 (referred to simply as "processor 160") and memory 162 for storing software 164. Processor 160 executes software 164, which includes a network-enabled client application 166 and operating software 168. The network-enabled client application 166 includes one or more routines used in implementing the TCP/IP protocol, which allows client 110 to communicate over network 112. Operating software 168 may include operating system 168a, which may include Windows XP®, a Web browser 168b, such as Internet Explorer®, and other various application programs.

Network 112 may be a local area network (LAN), a larger group of interconnected systems such as the Internet, a private intranet, or other similar wired or wireless networks. The network may include component networks, communication links, proxy servers, firewalls or other security mechanisms, Internet service providers (ISPs), gatekeepers, gateways, switches, routers, hubs, client terminals, and other network elements. A similar, or different, type of network (not shown) may be used to route communications between e-seal management system 106 and container 116.

Figure 2:
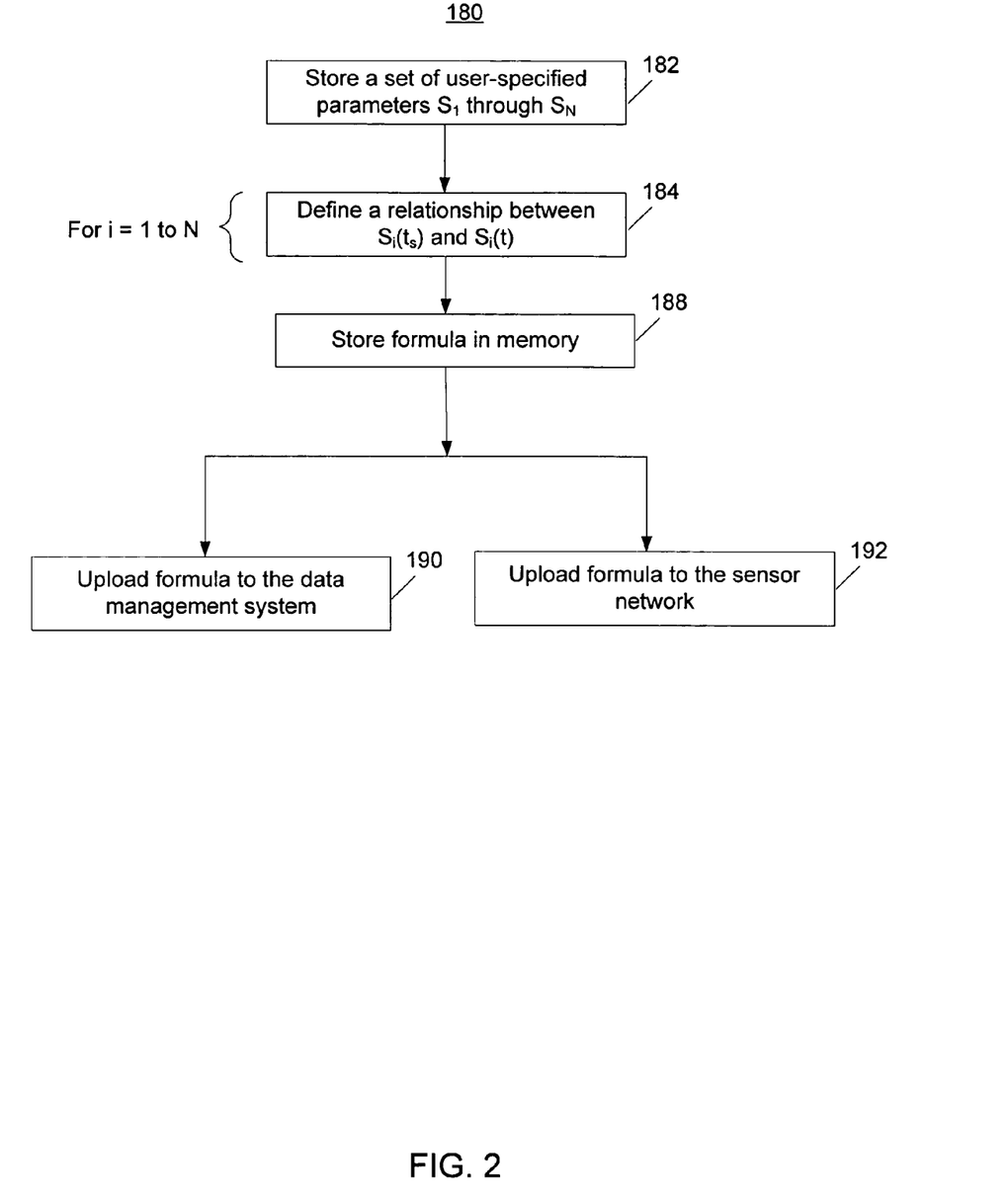
FIG. 2 is a flowchart illustrating a process for generating a formula that produces an e-seal.

FIG. 2 shows a process 180 for generating a formula to determine an e-seal. To begin process 180, user 114 specifies a set of parameters. Through client 110, user 114 accesses software 164 for specifying the parameters. When specifying a parameter, user 114 may, for example, type a parameter into a parameter field generated by the software or user 114 may select a parameter from a predefined list, also provided by the software. The user-specified parameters, $S_1$ through $S_N$, are stored (182) in memory. Typically the parameters, $S_1$ through $S_N$, are stored in memory 162 on client 110; however the parameters may be stored on a different computer, or on a remote server. For each of the parameters, $S_1$ through $S_N$, (denoted $S_i$) user 114 may define (184) a relationship for the parameter $S_i$ (where $S_i$ may be any of the parameters $S_1$ through $S_N$) recorded at an initial time, $t_s$, and the same parameter $S_i$ recorded at a later time, t. For example, $S_i(t_s)$ may represent an initial temperature reading while $S_i(t)$ may represent a temperature reading recorded one minute after the initial temperature reading.

User 114 may, for example, specify a mathematical relationship between the temperature readings to be an absolute value of their difference (i.e., $|S_i(t_s) - S_i(t)|$). The user 114 may type the relationship into an input field or select a predefined relationship from a list or a drop-down menu. The user 114 may define (184) further relationships between parameters, $S_1$ through $S_N$, recorded at various times. For example, the user 114 may define a mathematical relationship that sums the absolute values of the differences between the parameter values recorded at an initial time, $S_i(t_s)$, and their corresponding parameter values, $S_i(t)$, recorded at a later time. In this example, the formula for an e-seal at time t, denoted E(t), is $$E(t) = \sum_{i=1}^{N} |S_i(t_s) - S_i(t)|.$$

In this regard, user 114 may specify a formula that includes any mathematical relationship between parameters or combinations of parameters. For example, the formula may be a sum of the absolute differences between successive parameter readings. An example of such a formula is as follows:

$$E(t) = \sum_{i=1}^{N} |S_i(t) - S_i(t + \Delta t)|,$$

where $\Delta t$ is a finite increment of time. Examples of other formulas that may be used include, but are not limited to, a running average of parameter values and a weighted average of parameter values. The e-seal may also be derived from a statistical measure such as mean or variance, or it may be based on a statistical test. Such statistical tests include chi-squared tests, Fisher sign tests, paired or unpaired t-tests, binomial tests, and other similar statistical tests.

Defining (184) the relationship may also include defining "if cases", in which an alternative relationship or formula is applied if a given condition exists, e.g., a defective sensor is detected. For example, if a battery of a temperature sensor is low, or if the temperature sensor experiences an outage, an alternate formula that excludes temperature reading parameters may be used in place of an original formula that included temperature as a parameter.

The formula, including all parameters and "if cases", is stored (188) in memory, e.g., in memory 162 on client 110. The parameters used in the formula may be stored on the same or on a different computer or remote server. The user 114 may retrieve the formula at a later time and make modifications to it.

In one embodiment, the formula is uploaded (190) from client 110 to e-seal management system 106. In another embodiment, the formula is uploaded (192) to the sensor network 104. Thus, either e-seal management system 106 or sensor network 104 may be used to calculate the e-seal and to determine if it has been broken, as described below. A user 114 may initiate uploading of the formula through a secure Web site viewed using Web browser 168b on client 110. For example, user 114 may enter the formula into a field and select an icon that initiates uploading of data in the field. User 114 may be required to provide a password or some other form of authentication before the uploading of data can commence. If the formula is uploaded (192) to the sensor network 104, for example, sensor node 102a occupying the top sensor node may receive the formula. Node 102a may then distribute the formula to other sensor nodes 102b, 102c, and 102d in the sensor network 104.

Figure 3:
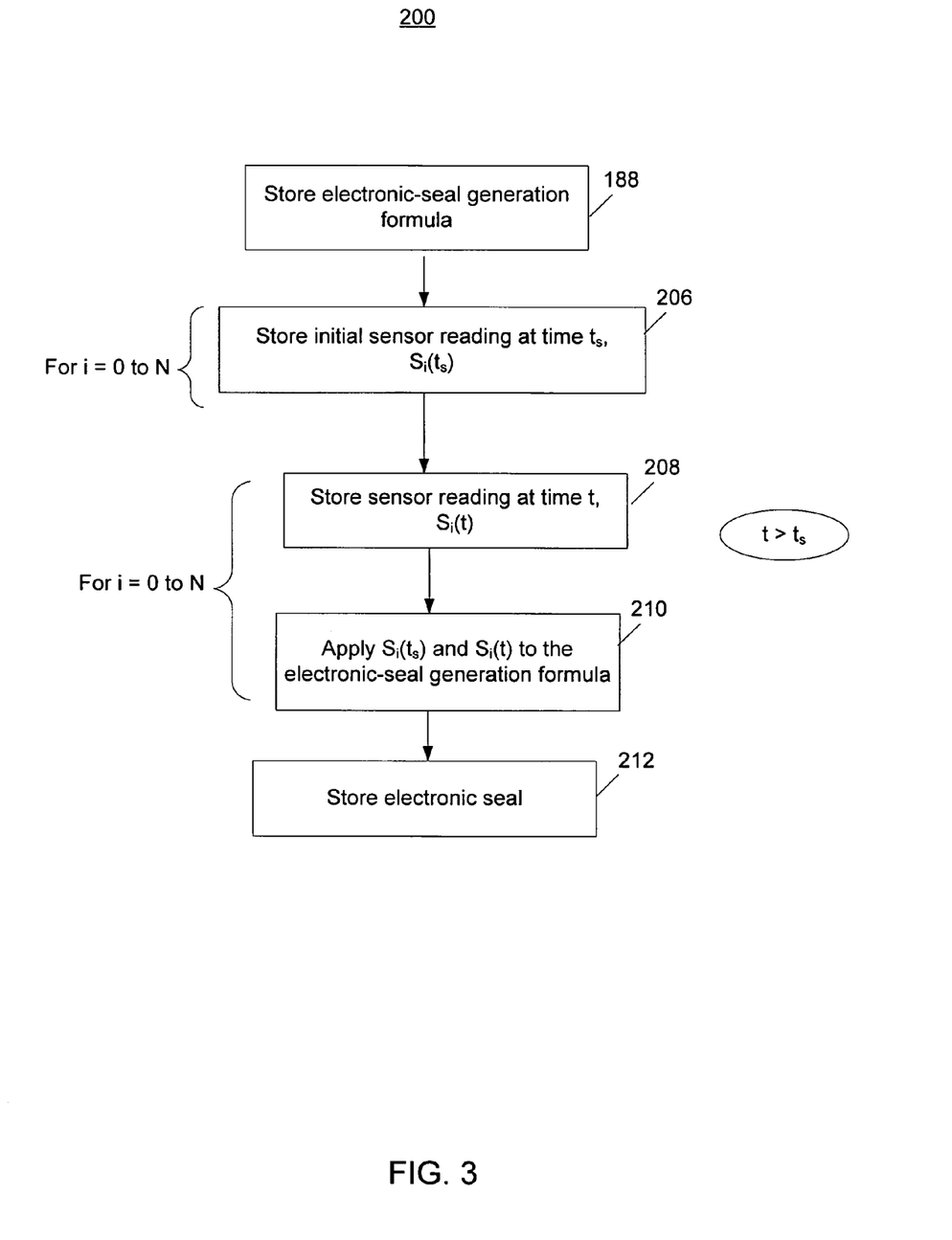
FIG. 3 is a flowchart illustrating a process for generating an e-seal using the formula generated in FIG. 2.

FIG. 3 illustrates a process 200 for generating an e-seal for monitoring the integrity of container 116. If e-seal management system 106 calculates the e-seal, the initial sensor readings, $S_1(t_s)$ through $S_N(t_s)$, recorded at sealing (time $t_s$) are sent from sensor network 104 to e-seal management system 106 and stored (206) in data storage module 120. The sensor readings include a value associated with a condition being measured (e.g., an environmental condition) and a time stamp that indicates when the reading was recorded. The readings may be transmitted to e-seal management system 106 and stored (208) in data storage 120. The readings may also be transmitted at predefined intervals of time or upon request only. The sensor readings, $S_1(t)$ through $S_N(t)$ and $S_1(t_s)$ through $S_N(t_s)$, are applied to the formula (210) and an e-seal is generated. The e-seal is then stored (212) in e-seal management system 106.

If sensor nodes 102 calculate the e-seal, the initial sensor readings are sent to a single node, e.g., the top sensor node if the nodes 102 have a hierarchy, and stored in memory 142. Sensor readings, $S_1(t)$ through $S_N(t)$, recorded at a time t after the initial sensor readings are transmitted by the sensor nodes 102. Alternatively, the sensor readings, $S_1(t)$ through $S_N(t)$, may be sent to a single sensor node 102 and stored (208) in memory 124. The sensor readings, $S_1(t)$ through $S_N(t)$ and $S_1(t_s)$ through $S_N(t_s)$, are applied to the formula (210) and an e-seal is generated. In one embodiment, the e-seal is generated by sensor node 102a or a combination of sensor nodes 102 in which the formula is stored. In this embodiment, the e-seal is sent to e-seal management system 106 and stored (212).

A unique identification code, derived from the initial sensor readings, $S_1(t_s)$ through $S_N(t_s)$, or derived separately from the sensor readings, may be assigned to container 116 and used for tracking purposes. The e-seal may be tested to determine in real-time whether the e-seal is broken or remains intact, and thus whether container 116 is breached or remains secure.

The processes described herein, including processes 180 and 200, can be implemented in digital electronic circuitry, or in computer software, firmware, or hardware, including the structural means disclosed in this specification and structural equivalents thereof, or in combinations of them. The processes can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes described herein, including method steps, can be performed by one or more programmable processors executing one or more computer programs to perform functions of the processes by operating on input data and generating output. The processes can also be performed by, and apparatus of the processes can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The processes can be implemented in a computing system that includes a back end component (e.g., a data server), a middleware component (e.g., an application server), or a front end component (e.g., a client computer having a graphical user interface or a Web browser through which a user can interact with an implementation of the processes), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The foregoing are examples for illustration only and not to limit the alternatives in any way. The processes described herein can be performed in a different order and still achieve desirable results. Although the processes are described using cargo container transportation examples, the processes described herein can be used to generate e-seals using sensor network parameters in any number of environments.

The processor described herein may be used in a variety of situations. For example system 100 may be used to electronically seal cargo containers in transit at shipping ports, train depots, cargo ships, and airplanes. The processor may also be useful in non-transportation situations that may include electronically sealing containers in storage and electronically sealing access to a contained site such as a bank vault or a classified building.

Method steps associated with generating an e-seal can be rearranged and/or one or more such steps can be omitted to achieve the same results described herein. Elements of different embodiments described herein may be combined to form other embodiments not specifically set forth above.

In other embodiments, the e-seal management system can be part of SAP® offering running inside or outside an SAP® enterprise system as a standalone system. This standalone system can work with other enterprise system from other companies. In one example, the e-seal management component (which performs processes 180 and 200) can be installed locally in a computer where the sensor net is installed and the enterprise system can be installed remotely at other location. The local computer can be a regular networked computer or special mini-computer, such as the Stargate® server from Intel®.

Other embodiments not specifically described herein are also within the scope of the following claims.

What is claimed is:

1. A system for generating an electronic seal for a container, the system comprising:
    a sensor configured to:
        detect first and second conditions associated with the container, the first and second conditions being different; and
        generate first and second sensor readings corresponding to the first and second conditions associated with the container; and
    a processing device configured to apply the first and second readings to a formula that generates a unique value, the unique value being indicative of an integrity of the container;
    wherein the electronic seal corresponds to the unique value.

2. The system of claim 1, wherein the sensor and the processing device comprise a sensor node of a sensor network.

3. The system of claim 1, wherein the sensor is part of a sensor node of a sensor network; and
    wherein the processing device is part of an electronic seal management system that communicates with the sensor network.

4. The system of claim 1, wherein the sensor is further configured to generate third and fourth readings, the third reading corresponding to the first condition and the fourth reading corresponding to the second condition, the first and second readings being recorded at a first time and the third and fourth readings being recorded at a second time, the second time being after the first time.

5. The system of claim 4, wherein the processing device generates the electronic seal by applying the third and fourth readings to the formula.

6. The system of claim 5, wherein the formula comprises a sum of an absolute value of a difference between the first and third readings and an absolute value of a difference between the second and fourth readings.

7. The system of claim 1, wherein at least one of the first and second conditions comprises an environmental condition associated with the container, the environmental condition comprising at least one of temperature, humidity, light, heat, carbon dioxide levels, chemical contamination, location, and movement.

8. The system of claim 1, wherein the sensor comprises a node of a sensor network, the sensor network being organized hierarchically.

9. A system for generating an electronic seal for a container, the system comprising:
    a sensor to detect a condition associated with the container and to generate a sensor reading based on the condition; and a processing device to generate the electronic seal based on the sensor reading;
    wherein the sensor reading comprises first and second readings from the sensor, the first reading being recorded at a first time and the second reading recorded at a second time, the second time being after the first time;
    wherein the processing device generates the electronic seal by applying the first and second readings to a formula that generates the electronic seal; and
    wherein the formula comprises a sum of an absolute value of a difference between the first and second readings.

10. The system of claim 1, wherein the sensor comprises a sensor node, the sensor node comprising a radio frequency transceiver and a programmable processor for use in communicating with the processing device.

11. A method for generating an electronic seal for a container, the method comprising:
    defining a formula for generating a unique value indicative of an integrity of the container, the electronic seal corresponding to the unique value;
    storing first and second sensor readings associated with first and second conditions of the container, the first and second conditions being different; and
    applying the first and second readings to the formula to generate the electronic seal.

12. The method of claim 11, wherein defining the formula comprises:
  storing a set of parameters that correspond to the sensor readings; and
  defining relationships between the parameters.

13. The method of claim 11, further comprising obtaining the sensor readings from a plurality of sensors, the plurality of sensors being at locations proximate to the container.

14. The method of claim 13, further comprising:
  detecting whether at least one of the sensors is defective; and if a defective sensor is detected, applying readings from sensors that are operational to an alternate formula to generate an electronic seal, the alternate formula defining a relationship between the readings from the operational sensors.

15. The method of claim 13, wherein the location is on, near, or inside the container.

16. The method of claim 11, wherein the electronic seal is generated in real-time.

17. A computer program product for generating an electronic seal for a container, the computer program product being tangibly embodied in an information carrier, the computer program product comprising instructions that cause a computer to:
  define a formula for generating a unique value indicative of an integrity of the container, the electronic seal corresponding to the unique value;
  store first and second sensor readings associated with first and second conditions of the container, the first and second conditions being different; and
  apply the first and second readings to the formula to generate the electronic seal.

18. The computer program product of claim 17, further comprising instructions to cause the computer to:
  store a set of parameters that correspond to the sensor readings; and
  define relationships between the parameters.

19. The computer program product of claim 17, further comprising instructions to cause the computer to obtain the sensor readings from a plurality of sensors, the plurality of sensors being at locations proximate to the container.

20. The computer program product of claim 19, further comprising instructions to cause the computer to:
  detect whether at least one of the sensors is defective; wherein
  if a defective sensor is detected, apply readings from sensors that are operational to an alternate formula to generate an electronic seal, the alternate formula defining a relationship between the readings from the operational sensors.

21. The computer program product of claim 17, wherein the electronic seal is generated in real-time.

* * * * *